US 8,249,088 B2

(12) United States Patent
Gupta et al.

(10) Patent No.: US 8,249,088 B2
(45) Date of Patent: Aug. 21, 2012

(54) HIERARCHICAL RATE LIMITING OF CONTROL PACKETS

(75) Inventors: Anubhav Gupta, Santa Clara, CA (US); Arunkumar M. Desigan, Santa Clara, CA (US); Arun Sharma, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 430 days.

(21) Appl. No.: 12/432,383

(22) Filed: Apr. 29, 2009

(65) Prior Publication Data
US 2010/0278191 A1 Nov. 4, 2010

(51) Int. Cl.
*H04L 12/28* (2006.01)
(52) U.S. Cl. ..................................... 370/419
(58) Field of Classification Search .................. None
See application file for complete search history.

(56) References Cited

U.S. PATENT DOCUMENTS

| | | | |
|---|---|---|---|
| 6,385,209 B1 * | 5/2002 | Skirmont et al. ............. | 370/419 |
| 6,724,721 B1 | 4/2004 | Cheriton | |
| 7,224,668 B1 | 5/2007 | Smethurst et al. | |
| 7,389,537 B1 | 6/2008 | Callon et al. | |
| 2004/0042470 A1 * | 3/2004 | Cooper et al. ................ | 370/401 |
| 2004/0250124 A1 | 12/2004 | Chesla et al. | |
| 2005/0157647 A1 * | 7/2005 | Sterne et al. ................. | 370/235 |
| 2008/0316921 A1 | 12/2008 | Mathews et al. | |
| 2009/0260083 A1 * | 10/2009 | Szeto et al. ................... | 726/22 |

FOREIGN PATENT DOCUMENTS

EP   1560398 A2   8/2005

OTHER PUBLICATIONS

Configuring Point-to-Point Protocol, Chapter 4, JUNOSe 7.2.x Link Layer Configuration Guide, Jun. 5, 2006, pp. 135-162.
PPPoE Connection Throttling, Cisco Systems, Inc., Feb. 28, 2006, 12 pages.

* cited by examiner

*Primary Examiner* — Otis L Thompson, Jr.
(74) *Attorney, Agent, or Firm* — Blakely, Sokoloff, Taylor & Zafman LLP (57) ABSTRACT

Line cards receive control packets and perform a hierarchical rate limiting on those control packets. A set of identifier keys are extracted from the control packets and the protocol of those control packets are determined. At a first level, the control packets are rate limited per unique set of identifier keys per protocol. Those packets which fail the first rate limiting level are dropped. Those packets which pass the first rate limiting level are rate limited at a second level per protocol type. Those packets which fail the second level rate limiting are dropped while those packets which pass the second level rate limiting are sent to the control card for further processing.

7 Claims, 6 Drawing Sheets

HIERARCHICAL RATE LIMITING OF CONTROL PACKETS

BACKGROUND

1. Field

Embodiments of the invention relate to the field of network processing; and more specifically, to hierarchical rate limiting of control packets received on a line card of a network element.

2. Background

Network elements typically include multiple line cards that perform packet forwarding/switching at high speed under the direction of one or more control cards. The control cards perform signaling, routing (including creation of and/or management of routing tables), connection setup, session setup, etc. The line cards receive data packets (which are typically forwarded/switched at a high speed) and control packets which need to be processed by the control card. Control packets typically are related to signaling, routing updates, connection setup, session setup, etc.

For example, in the case of PPPoE (Point to Point Protocol over Ethernet), the line cards can receive from computing end devices PPPoE Active Discovery Request (PADR) control packets and PPPoE Active Discovery Initiate (PADI) control packets. These PADR and PADI packets must be sent to the control card for further processing. Other examples of control packets include DHCP (Dynamic Host Configuration Protocol) packets, CLIPS (Clientless IP Service) packets, Neighbor Discovery for IPv6, ARP (Address Resolution Protocol) packets.

Commonly, line cards employ a coarse control packet rate limiting mechanism on each of the line cards to prevent a large amount of packets from being sent from the line cards to the control card. These rate limits are typically applied per physical entity (e.g., per card, per port, etc.) or per protocol and apply to multiple subscribers or computer end stations. Typically, the rate limits indicate the quantity of control packets that may be sent to the line card. If over the rate limit, the control packets are typically dropped in the line cards.

Thus, since the rate limits are typically applied per physical entity or protocol, a single computer end station transmitting an exorbitant amount of control packets causing the rate limit to be exceeded can cause existing subscriber's control packets to be dropped or lead to new subscriber sessions to fail since those control packets will be dropped.

SUMMARY

In one embodiment of the invention, control packets are hierarchically rate limited on a line card of a network element. For each received control packet on the line card, the protocol type of that control packet is determined, a set of one or more identifier keys in that control packet are extracted based on the protocol type of the control packet (and in some instances specific control packets (e.g., PADR (PPPoE Active Discovery Request) packets and PADI (PPPoE Active Discovery Initiate) packets)), and an identifier key based rate limiting is performed based on the set of extracted identifier keys and the determined protocol type of the control packet. Those control packets which do not pass the identifier key based rate limiting (e.g., those packets whose corresponding packet count value for that set of identifier keys for that protocol exceeds an identifier key based rate limit value) are dropped. Those control packets which pass the identifier key based rate limiting are rate limited at a protocol level based on the protocol type of the control packets (e.g., per protocol). Those control packets which pass the protocol level rate limiting are allowed to be directed to a control card for further processing, while those control packets which do not pass the protocol level rate limiting (e.g., those packets whose corresponding packet count rate limit value per protocol exceeds a protocol level rate limit value for that protocol) are dropped.

In some embodiments, one or more of the set of identifier keys, the identifier key based rate limiting value, and the protocol level rate limit value are configurable by a system operator of the network element allowing flexible control packet rate limiting. Thus, control packets from different computer end stations (and different network interfaces within the computer end stations) can be rate limited separately while an overall protocol level rate limiting for each line card is maintained. Thus, the hierarchical control packet rate limiting protects against computer end stations performing denial of service attacks by controlling the amount of control packets accepted for processing for each computer end station while allowing legitimate control packet traffic to be accepted.

In one embodiment of the invention, each line card of a network element includes a packet parsing engine to parse control packets to determine protocol types of the control packets and extract a set of one or more identifier keys in each control packet based on the determined protocol type of the control packets. Each line card also includes multiple first level execution units to perform a first level of control packet rate limiting on received control packets per unique ones of the set of identifier keys and protocol type according to a number of control packets of each unique protocol type and set of identifier keys that are accepted for processing over a first time interval. The first level execution units drop those control packets that fail the first level of control packet rate limiting (e.g., those packets whose corresponding packet count value for the set of identifier keys and protocol exceed an identifier key based rate limit value). Each line card also includes a set of one or more second level execution units to perform a second level of control packet rate limiting on those packets that pass the first level of control packet rate limiting per protocol type according to a number of control packets of each unique protocol type that are accepted for processing over a second time interval. The set of second level execution units drop those control packets that fail the second level of control packet rate limiting (e.g., those packets whose corresponding packet count rate limit value per protocol exceeds a protocol level rate limit value for that protocol). Those packets which pass the second level of control packet rate limiting are allowed to be directed to the control card for further processing.

In one embodiment of the invention, a line card for rate limiting control packets includes multiple network processing units (NPUs), each having a separate memory domain and is coupled with one or more ports of the line card, and a central line processor. Each NPU receives packets to process including control packets and data packets. Each NPU includes a packet parsing engine to parse control packets to determine a protocol type of the control packets and to extract a set of one or more identifier keys from each control packet based on the determined protocol type of that control packet. Each NPU further includes multiple first level execution units to perform an identifier key based rate limiting for each unique set of extracted identifier keys per protocol type. The first level execution units will drop those control packets which do not pass the identifier key based rate limiting. Each NPU further includes a set of one or more second level execution units to perform a protocol based rate limiting on each of those control packets that pass the identifier key based rate limiting. The set of second level execution units drops those control packets which do not pass the protocol based rate limiting and sends those control packets which do pass to the central line processor of the line card along with current packet count values associated with each of those control packets (e.g., for each control packet a identifier key control packet count value and a protocol control packet count value). The central line processor aggregates the control packets received from the multiple NPUs that have the same set of identifier keys per protocol (e.g., for each unique set of identifier keys per protocol, the central line processor adds the packet count values received from the NPUs), and aggregates the control packets received from the multiple NPUs per protocol type (e.g., for each control packet per protocol, the central line processor adds the protocol control packet count values received from the NPUs). The central line processor performs an aggregate identifier key based rate limiting on the control packets received from the NPUs for each unique set of identifier keys per protocol type according to the aggregated packet count value for those unique set of identifier keys per protocol type. The central line processor drops those control packets that fail the aggregate identifier key based rate limiting. The central line processor performs an aggregate protocol based rate limiting for those control packets that pass the aggregate identifier key based rate limiting for each unique protocol type according to the aggregated packet count value for those unique protocol types. The central line processor drops those control packets which fail the aggregate protocol based rate limiting. Those packets which pass the aggregate protocol based rate limiting are allowed to be directed to the control card for further processing.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

A method and apparatus for hierarchical rate limiting of control packets is described. In one embodiment of the invention, control packets are rate limited at a first level based on a set of one or more identifier keys included in the control packets (e.g., one or more of source MAC address, source IP address, GIADDR (Gateway IP Address), etc.). The identifier key rate limiting values are configurable by a system operator of the network element. Those packets which do not pass the identifier key based rate limiting are dropped. Those packets which pass the identifier key based rate limiting are queued (if the queue depth has not been exceeded) and those packets are rate limited at a second level based on the protocol of the packet. Those packets which do not pass the second level rate limiting are dropped, while those that pass the second level rate limiting are allowed to be sent to the control card for further processing.

In one embodiment, each line card includes multiple execution units that each process control packets and each perform the first level rate limiting (e.g., identifier key based rate limiting). Each line card also includes a set of one or more execution units that perform the second level rate limiting (e.g., protocol based rate limiting).

In one embodiment, each line card includes multiple network processing units (NPUs) and a central line processor. Each of the NPUs includes multiple execution units that each process control packets and each perform the first level rate limiting (e.g., identifier key based rate limiting), and a set of one or more execution units that perform the second level rate limiting (e.g., protocol based rate limiting). Those packets which pass the second level rate limiting are sent to the central line processor. The central line processor aggregates the control packets and the control packet counts based on identifier key and protocol. The central line processor performs a third level rate limiting based on the aggregate count for the identifier keys. Those control packets which do not pass the third level rate limiting are dropped, while a fourth level rate limiting is applied to those packets that pass the third level rate limiting. The fourth level rate limiting is based on the aggregate packet count for the protocol. Those packets which pass the fourth level rate limiting are allowed to be sent to the control card for further processing while those packets which do not pass the fourth level rate limiting are dropped.

Figure 1:
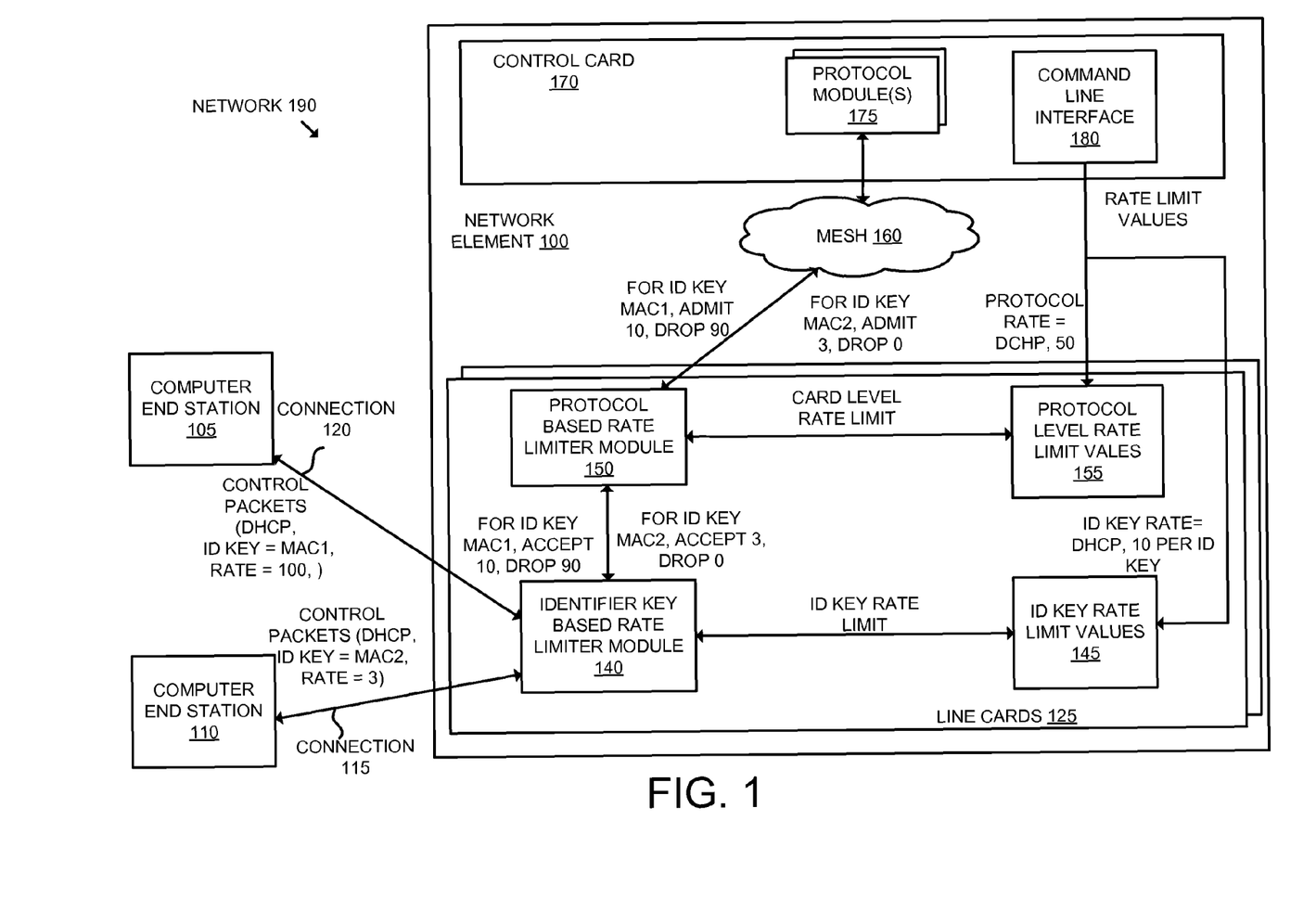
FIG. 1 illustrates an exemplary network including a network element performing hierarchical rate limiting of control packets according to one embodiment of the invention.

FIG. 1 illustrates an exemplary network including a network element performing hierarchical rate limiting of control packets according to one embodiment of the invention. The network 190 includes the computer end stations 105 and 110 and the network element 100. In one embodiment, the computer end stations 105 and 110 are subscriber computer end stations of a different end user and the network element 100 is an edge network element. Although not illustrated in FIG. 1, it should be understood that the computer end stations 105 and 110 may connect with the network 100 through one or more other computing devices (e.g., access devices such as a DSLAM, CMTS, etc.).

The computer end station 105 transmits packets (including data packets and control packets) to the network element 100 and receives packets transmitted from the network element 100 over the connection 120. Similarly, the computer end station 110 transmits packets (including data packets and control packets) to the network element 100 and receives packets transmitted from the network element 100 over the connection 115.

The network element 100 includes multiple line cards 125 coupled with the control card 170 through the high speed mesh 160. The line cards 125 receive control packets and send the control packets to the control card 170 for further processing. The line cards 125 perform hierarchical rate limiting on the control packets it receives (thus, the line cards 125 throttle the number of control packets that are sent to the control card 170 in multiple levels). In one embodiment, the line cards 125 perform an identifier key based rate limiting at a first level and a protocol level rate limiting at a second level.

The line cards 125 each include an identifier key based rate limiter module 140 that performs the identifier key based rate limiting based on a set of one or more identifier keys that are associated with the control packets it receives. The set of set of identifier keys can be different for different protocols. The set of identifier keys for a given control packet identify and classify that control packet. For example, the set of identifier keys may be associated with a subscriber of the network element 100. The set of identifier keys can include information in the control packets (e.g., source MAC address, destination MAC address, GIADDR, etc.) and information associated with the control packets that has local significance to the network element 100 (e.g., a local identifier assigned to the circuit on which the packet was received, the port on which the control packets are received, etc.). In some embodiments, the system operator may define the identifier keys that the identifier key based rate limiting is based on.

The line cards 125 also include the protocol based rate limiter module 150 to perform the protocol based rate limiting based on the protocol type of the control packets and/or on the type of the control packets. For example, the protocol based rate limiter module 150 can perform rate limiting for all DHCP packets received on the line card. As another example, the protocol based rate limiter module 150 can perform rate limiting for specific types of control packets such as PADR (PPPoE Active Discovery Request) packets and PADI (PPPoE Active Discovery Initiate) packets. In one embodiment, the protocol based rate limiter module 150 performs the protocol based rate limiting on those packets which pass the identifier key based rate limiting.

The identifier key based rate limiter module 140 retrieves the identifier key rate limits used in the identifier key based rate limiting from the identifier key based rate limit values 145. The protocol based rate limiter module 150 retrieves the rate limits for the protocols based rate limiting from the protocol level rate limit values 155.

In one embodiment, the rate limit values (e.g., the protocol level rate limit values 155 and the identifier key rate limit values 145) are configurable by a system operator of the network element 100. For example, the system operator can use the command line interface 180 of the control card 170 to configure the protocol level rate limit values 155 and the identifier key based rate limit values 145. For example, for each protocol type (and in some instances control packet type (e.g., PADI or PADR)) the system operator can set the number of control packets allowed for the identifier keys over a specified amount of time (allow-interval). In addition, the system operator can configure the amount of time of the allow-interval and can configure a drop-interval which indicates the amount of time that control packets that fail will be dropped until the next allow-interval starts. Additionally, for each protocol type (and in some instances control packet type) the system operator can set the total number of control packets allowed for that protocol (or control packet type) over a specified allow-interval. In addition, the system operator can configure the amount of time for the allow-interval and can configure the amount of time for a drop-interval for the protocol.

As previously described, the computer end stations 105 and 110 transmit and receive control packets over the connections 120 and 115 respectively. The control packets may be for different protocols in different embodiments of the invention (e.g., DHCP (Dynamic Host Configuration Protocol) control packets, PPPoE (Point to Point Protocol over Ethernet) control packets (e.g., PADR packets, PADI packets), ARP (Address Resolution Packets), Neighbor Discovery for IPv6 packets, etc.). The control packets which are allowed to be sent to the control card 170 will be processed by appropriate ones of the protocol module(s) 175. For example, PPPoE control packets may be processed by a PPPoE module of the protocol module(s) 175.

In one embodiment, for PPPoE subscribers, the PADR and PADI packets are rate limited separately. While in one embodiment the identifier key used for PADR and PADI packets is the source MAC address included in the packets, in other embodiments the identifier key is different (e.g., based on the source and destination MAC address, the destination MAC address, etc.). For ARP packets, the identifier key is the source MAC address included in the ARP packets. For DHCP control packets, the identifier key is the source MAC address and optionally the GIADDR included in the packets.

As illustrated in FIG. 1, the computer end stations 105 and 110 are transmitting DHCP control packets over the connections 120 and 115 respectively. However, it should be understood that the computer end stations 105 and 110 can transmit different control packets over the connections 120 and 115 respectively. For purposes of explanation, the connections 120 and 115 are terminated on the same one of the line cards 125. The computer end station 105 is transmitting DHCP control packets over the connection 120 at a rate of 100 packets over a particular time period with an identifier key of MAC1. The computer end station 105 is transmitting DHCP control packets over the connection 125 at a rate of 3 packets over that same time period with an identifier key of MAC2.

The identifier key based rate limiter module 140 applies an identifier key based rate limiting on the control packets (e.g., the DHCP packets received from the computer end stations 105 and 110). The identifier key based rate limiter module 140 retrieves the rate limit values associated with the identifier keys from the identifier key based rate limit values 145. For example, based on the protocol type of the packet (e.g., DHCP), the identifier key based rate limit values 145 indicates a number of packets that can be accepted over an allow interval for each different identifier key of that protocol type (e.g., each different source MAC address and optionally GIADDR of the DHCP packets). As illustrated in FIG. 1, for each unique identifier key for DCHP control packets, ten DHCP control packets are allowed over the time period (e.g., the same time period in which the computer end stations 105 and 110 are transmitting 100 DHCP packets and 3 DHCP packets respectively). Since the computer end station 105 transmits 100 DHCP packets over the time period, which exceeds the identifier key rate limit of 10, the identifier key based rate limiter module 140 accepts 10 DCHP packets and drops 90 of those DHCP packets. Since the computer end station 110 transmits 3 DHCP packets over the time period, which is below the identifier key rate limit, the identifier key based rate limiter module 140 accepts all three of the DHCP packets. In one embodiment, accepting the control packets includes enqueuing the packets to a protocol specific queue or in some instances, a control packet type specific queue (e.g., a DHCP control packet queue, a PADI queue, a PADR queue, etc.).

Sometime after the control packets are rate limited based on the identifier keys, those packets which have passed are rate limited at a card level by the card level based rate limiter module 150 based on the protocol of the control packets or in some instances control packet type. The card level based rate limiter module 150 retrieves the card level rate limits (per protocol) from the card level rate limit values 155. For example, based on the protocol type of the packet (e.g., DHCP), the card level rate limit values 155 indicates a number of control packets of that protocol that can be admitted to the control card 170. As illustrated in FIG. 1, a total of 50 DHCP control packets can be admitted to the control card 170 over the time period. Assuming that the computer end stations 105 and 110 are the only entities transmitting DHCP control packets to the line cards 125, the card level based rate limiter module 150 admits 10 DHCP control packets with the identifier key of MAC1 (from the computer end station 105) and admits 3 DHCP control packets with the identifier key of MAC2 (from the computer end station 110).

Figure 2:
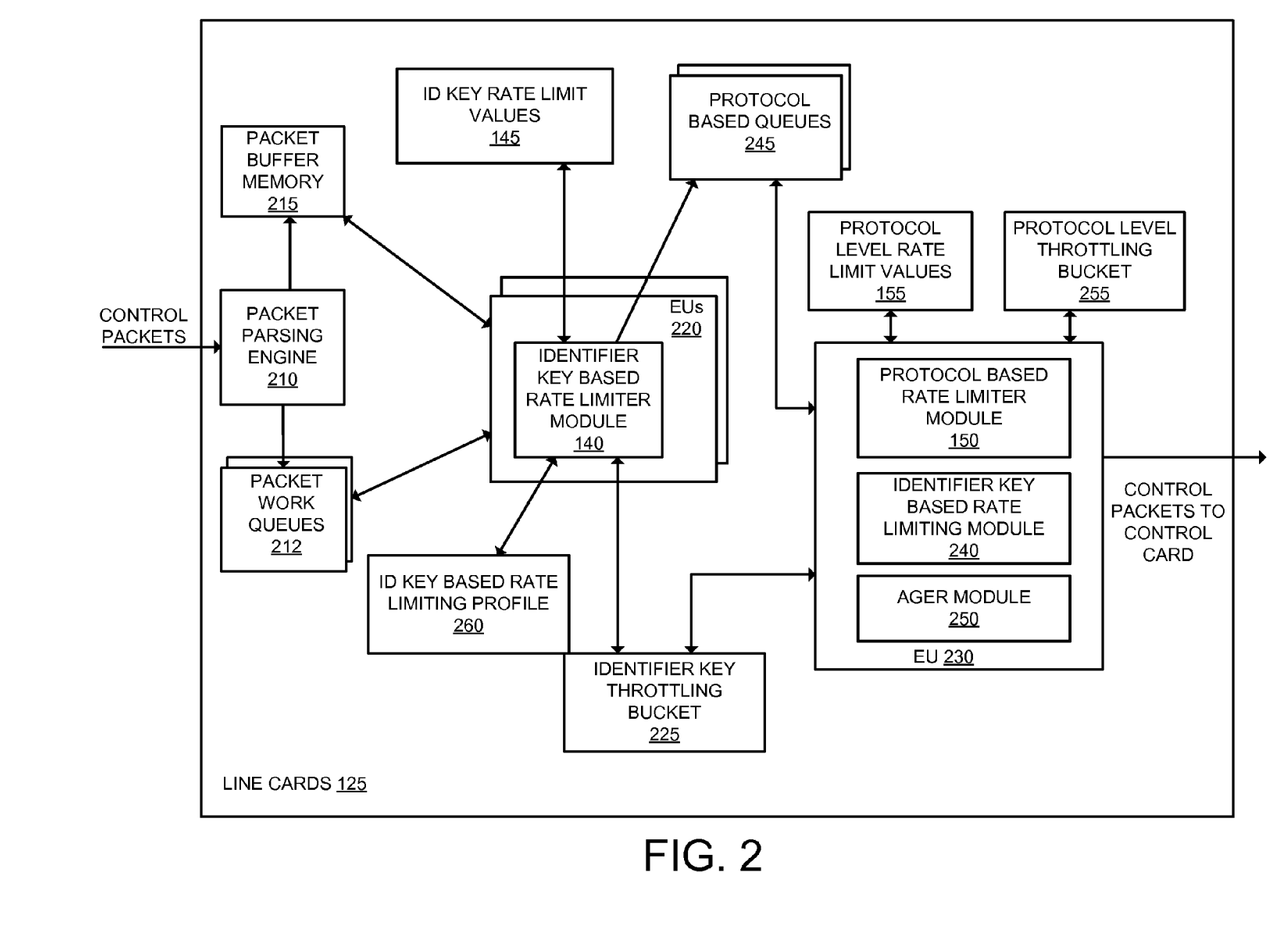
FIG. 2 illustrates an exemplary line card of a network element illustrated in FIG. 1 according to one embodiment of the invention.

FIG. 2 illustrates a more detailed view of one of the line cards 125 of the network element 100 according to one embodiment of the invention. The packet parsing engine 210 parses control packets received at the line cards 125 to extract the data in the packet and write the packet data into the packet buffer memory 215. Based on the data extracted, the packet's protocol and type of control packet can be determined. In addition, a priority is also assigned to the control packet (e.g., different protocols may have different priorities). The control packet is enqueued to one of the packet work queues 212 based on the priority assigned to the control packet. The execution units 220, which each execute an instance of the identifier key based rate limiter module 140, cycle through the packet work queues 212 for pending packets to process.

Based on the packet's protocol, the identifier key based rate limiter module 140 determines which one or more parameters associated with the packet to use when generating an identifier key (e.g., source MAC address field for PADI and PADR packets, etc.). In one embodiment, the identifier key based rate limiting profile 260 stores a profile that indicates which parts of the packet to use based on the protocol type or control packet type of the control packet. The identifier key based rate limiter module 140 then extracts the one or more parts of the packet to extract the one or more identifier keys. In addition, local properties of the packet may be used generating the identifier key (e.g., unique local identifier that identifies the connection the control packet belongs (e.g., slot/port/channel/unique-identifier), etc.).

The identifier key based rate limiter module 140 retrieves the rate limit values associated with the key from the identifier key rate limit values 145. In one embodiment of the invention, all keys belonging to the same protocol (e.g., DHCP) or control packet type (e.g., PADI or PADR) have the same rate limit value, while in other embodiments each unique key can be associated with a different rate limit value.

In one embodiment, the identifier key based rate limiter module 140 applies a hash function to the set of one or more extracted identifier keys to generate a key to index into the identifier key throttling bucket 225 to retrieve a number of parameters relating to identifier key throttling. In one embodiment, the identifier key throttling bucket 225 is a hash table that is indexed by the generated key and includes a number of parameters relating to the throttling (e.g., source MAC address of the packet, number of packets already admitted (during the time period), a timestamp of the last packet, and a set of attributes to allow locking/synchronization of these parameters for multiple packets with the same key). The number of packets already admitted during the time period for that identifier key is compared with the rate limit value for that key. If the rate limit value is exceeded, or admission of the packet would cause the value to be exceeded, the identifier key based rate limiter module 140 drops that control packet.

However, if the rate limit value is not exceeded, then the identifier key based rate limiter module 140 enqueues the control packet into one of the protocol based queues 245 based on the protocol or control packet type (e.g., a separate queue for DHCP control packets, ARP control packets, PADI packets, PADR packets, and Neighbor Discovery for IPv6 packets). The identifier key based rate limiter module 140 also adds the control packet to the identifier key throttling bucket (e.g., updates the number of packets admitted, updates the timestamp, etc.).

In one embodiment, the identifier key based rate limiting module 240 does not enqueue control packets to the protocol based queues 245 if the depth of those queues (the number of packets currently enqueued) is greater than a threshold. Each of the protocol based queues can have a different depth threshold.

The execution unit 230 performs a second level rate limiting (a protocol based rate limiting) based on the protocol of the control packet or the type of control packet. The protocol based rate limiter module 150 retrieves the rate limit values associated with the protocol or type of control packet from the protocol level rate limit values 155. Different protocols or different types of control packet can have different protocol level rate limit values.

The protocol based rate limiter module 150 accesses the protocol level throttling bucket 255 based on the protocol or control packet type of the control packet. The protocol level throttling bucket includes a number of parameters related to the protocol level rate limiting (e.g., number of packets admitted (during the time period), a timestamp of the last packet, etc.). The number of packets admitted during the time period for that protocol or control packet type is compared with the rate limit value for that protocol or control packet type respectively. The protocol based rate limiter 150 drops those packets (e.g., removes those packets from the protocol based queues 245) whose number of packets admitted currently exceed the rate limit value. For those packets which pass the protocol level rate limiting, the protocol based rate limiter 150 updates the protocol level throttling bucket 255 and directs those packets to the control card for further processing.

In some embodiments, the execution unit 230 works in the background and performs work in addition to the protocol level rate limiting. For example, as illustrated in FIG. 2, the execution unit 230 also executes an ager module 250 to remove and manage stale entries from the identifier key throttling bucket 225 and optionally the protocol level throttling bucket 255. In one embodiment, the ager module 250 is triggered to execute based on expiration of an ager timer. Additionally, as illustrated in FIG. 2, the execution unit 230 executes the identifier key based rate limiting module 240 which is similar to the identifier key based rate limiter module 140 executed by the execution units 220.

Since there are multiple execution units 220, there is a chance that multiple execution units can attempt to perform identifier key based rate limiting on the same key at approximately the same time which can lead to an execution unit using stale information when determining whether to accept a packet. In one embodiment, when one of the execution units 220 begins the identifier key based rate limiting for an identifier key, that execution unit sets a flag to indicate to the other execution units that it is currently performing identifier key based rate limiting on that identifier key. If a different one of the execution units 220 receives a control packet with that identifier key while the flag is set, the execution unit 220 does not perform identifier key based rate limiting and notifies the execution unit 230 that the identifier key based rate limiting has not been performed. In one embodiment, that different one of the execution units 220 enqueues that control packet into the appropriate one of the protocol based queues 245. Sometime after receiving such an indication, the identifier key based rate limiting module 240 of the execution unit 230 performs the identifier key based rate limiting in a similar way as described above.

In one embodiment, the execution unit 230 may periodically execute the identifier key based rate limiting module 240 to validate the performance of the execution units 220 and may determine to drop a packet accepted by the execution units 220.

Figure 3:
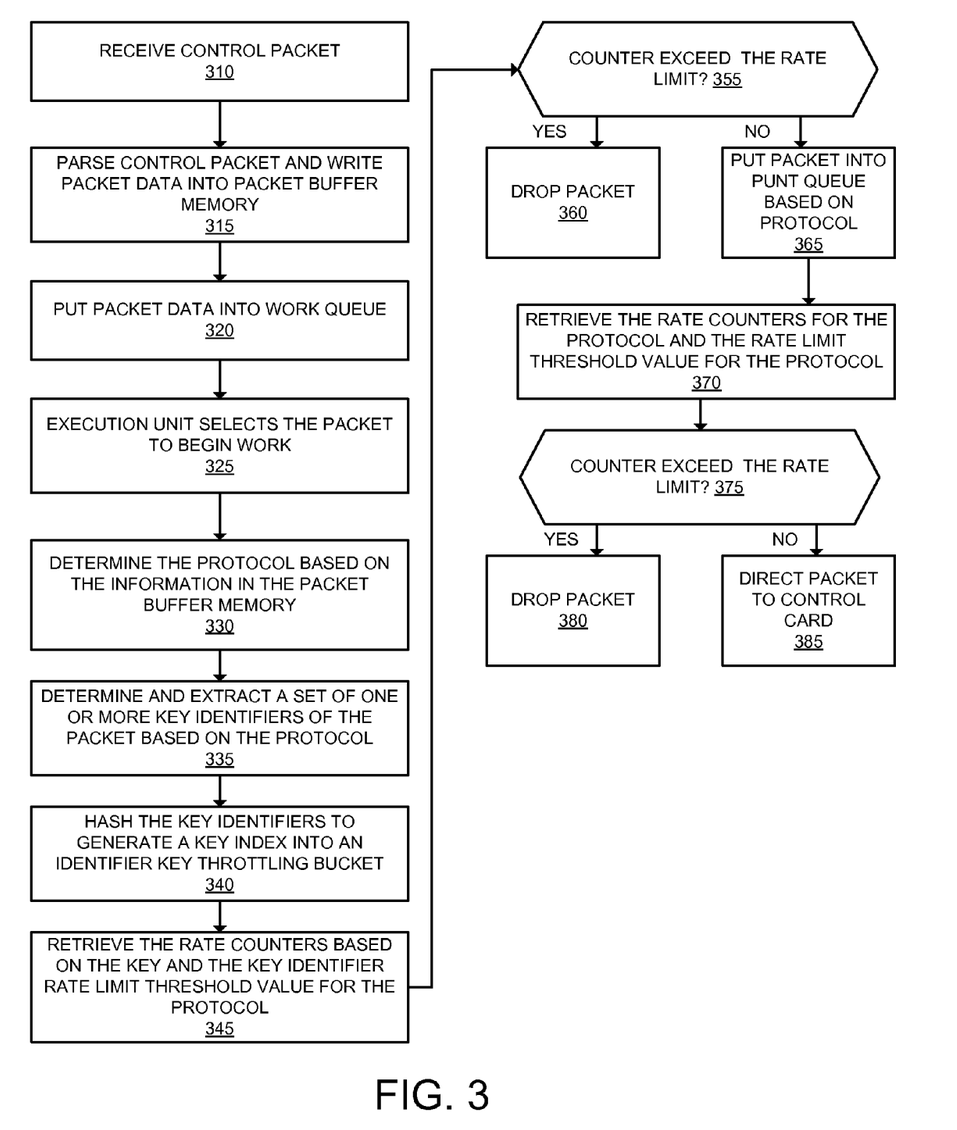
FIG. 3 is a flow diagram illustrating exemplary operations for hierarchical control packet rate limiting according to one embodiment of the invention.

FIG. 3 is a flow diagram illustrating exemplary operations for hierarchical control packet rate limiting according to one embodiment of the invention. The operations of FIG. 3 will be described with reference to the exemplary embodiment of FIG. 2. However, it should be understood that the operations of FIG. 3 can be performed by embodiments of the invention other than those discussed with reference to FIG. 2, and the embodiments discussed with reference to FIG. 2 can perform operations different than those discussed with reference to FIG. 3.

At block 310, one of the line cards 125 receives a control packet. Flow moves to block 315, where the packet parsing engine 210 on that line card parses the received control packet and writes packet data into the packet buffer memory 215. Flow then moves to block 320, where the packet is enqueued into one of multiple packet work queues 212 based on priority of the packet. Flow moves from block 320 to block 325.

At block 325, one of the execution units 220 selects the control packet from the packet work queues 212 to begin processing. Flow next moves to block 330 where the protocol is determined based on information in the packet buffer memory. If the protocol includes multiple types of control packets that are separately rate limited (e.g., PADI and PADR packets), the type of control packet is also determined. In one embodiment, a protocol identifier is associated with the control packet that identifies the protocol type of the packet and/or the control packet type.

Flow then moves to block 335 where the identifier key based rate limiter module 140 determines the set of one or more key identifiers included in the packet to extract based on the protocol or type of control packet of the packet and extracts those identifiers. For example, if the control packet is a DHCP packet, then the source MAC address and optionally the GIADDR is extracted from that packet. As another example, if the control packet is a PADI or PADR packet, then the source MAC address is extracted from that packet. Of course, it should be understood that the system operator may configure different identifier keys to be used for the control packets. Flow moves from block 335 to block 340.

At block 340, the identifier key based rate limiting module 340 applies a hash function to the extracted key identifiers to generate a key index to index into the identifier key throttling bucket 225. Flow moves from block 340 to block 345. At block 345, the identifier key based rate limiting module 340 accesses the identifier key throttling bucket using the generated key index and retrieves the rate counters associated with that key index including the number of packets associated with that key that have been accepted in the current time interval. In addition, the identifier key based rate limiting module 140 accesses the identifier key rate limit values 145 and retrieves the key identifier rate limit threshold value for the identifier key. Flow moves from block 345 to block 355.

At block 355, the identifier key based rate limiter module 140 determines whether the addition of the control packet to the value of the rate counters associated with the key index exceeds the key identifier rate limit threshold value. If the key identifier rate limit threshold value would be exceeded, then flow moves to block 360 where the packet is dropped. Otherwise flow moves to block 365, where the key is enqueued into the appropriate one of the protocol based queues 245.

In one embodiment, prior to enqueuing the packet into one of the protocol based queues 245, the identifier key based rate limiter module 140 checks the queue depth of that queue. If the addition of the packet would cause the queue depth to exceed a queue depth threshold, then the identifier key based rate limiter module 140 will drop the packet.

Flow moves from block 365 to block 370. At block 370, the protocol based rate limiter module 150 accesses the protocol level rate limit values 155 and retrieves the protocol level rate limit value for the protocol type of the packet or the control packet type. In addition, the protocol based rate limiter module 150 accesses the protocol level throttling bucket 255 and retrieves the rate counters associated with the protocol or type of control packet. Flow moves from block 370 to block 375.

At block 375, the protocol based rate limiter module 150 determines whether the addition of the control packet to the value of the protocol level rate counter exceeds the card level rate limit value associated with the protocol type or the control packet type. If the protocol level rate limit is exceeded, then flow moves to block 380 where the packet is dropped. Otherwise, flow moves to block 385 where the protocol based rate limiter module 150 directs the packet to the control card. In addition, the protocol based rate limiter module 150 updates the protocol level throttling bucket 255 to reflect the packet being sent to the control card.

Thus, the control packets can be rate limited in a hierarchical way to provide a granular and flexible control packet rate limiting. In some embodiments, the system operators can configure the granularity of the rate limiting and the key(s) used to identify the control packets. In addition, in some embodiments, the control packets can be rate limited based on protocol (e.g., DHCP) and/or based on specific types of control packets (e.g., PADR and PADI packets). Since the rate limiting is flexible and can be performed at different levels including a control packet identification level and a protocol level, the control packets from different computer end stations (and different network interfaces within a computing end station) can be rate limited separately while an overall protocol control packet rate limiting for each line card is maintained. Thus, the hierarchical control packet rate limiting protects against computer end stations performing denial of service attacks by transmitting large amounts of control packets to the network element while allowing legitimate control packet traffic to be accepted.

Figure 4:
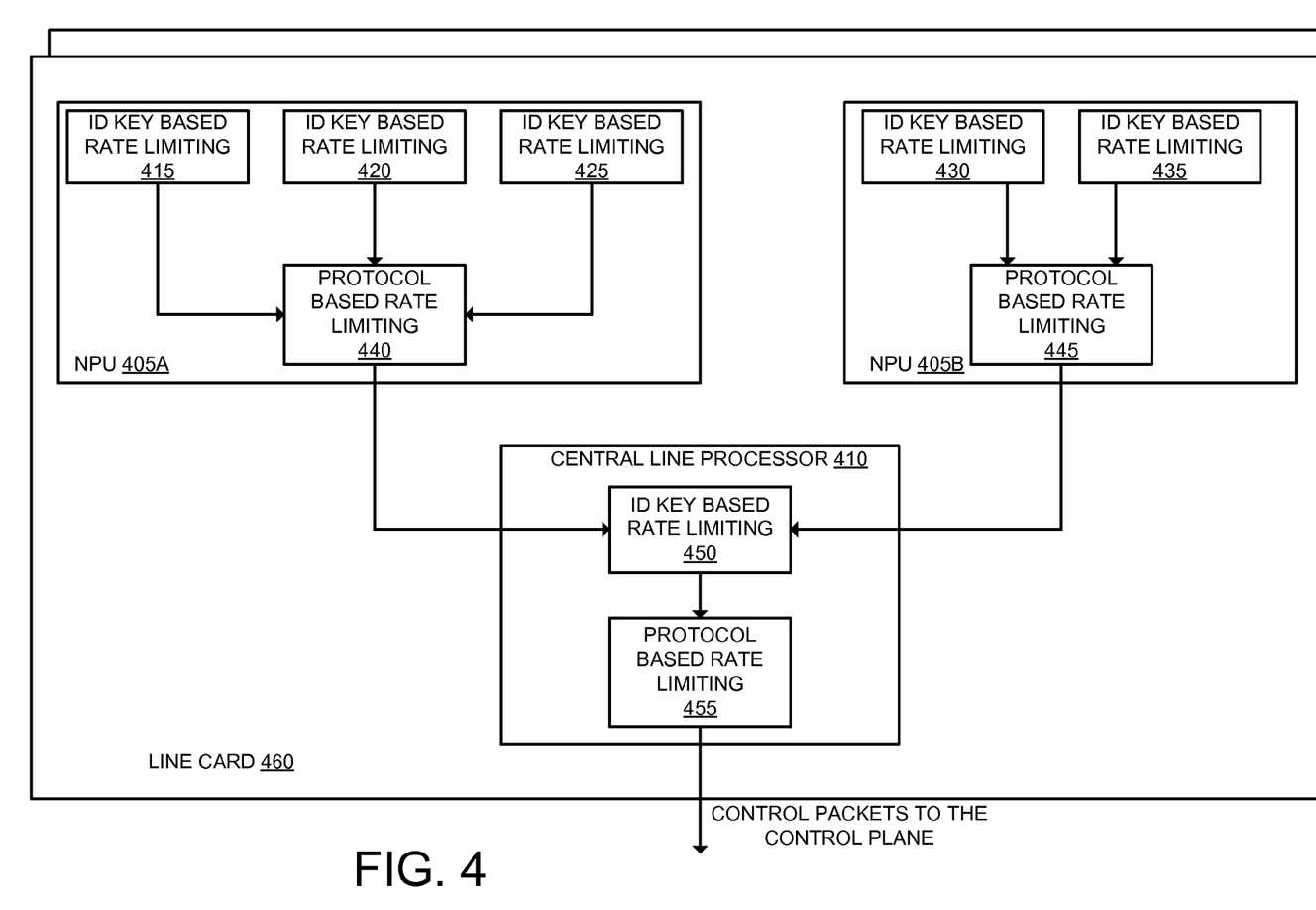
FIG. 4 illustrates a line card with multiple network processing units performing hierarchical rate limiting for control packets according to one embodiment of the invention.

In some embodiments, the line cards in the network element include multiple network processing units (NPUs) which each can separately perform identifier key based rate limiting and protocol based rate limiting. FIG. 4 illustrates line cards with multiple network processing units performing hierarchical rate limiting for control packets according to one embodiment of the invention.

As illustrated in FIG. 4, each of the line cards 460 includes the NPUs 405A and 405B. It should be understood that the number of NPUs is exemplary, as line cards may include a different number of NPUs in embodiments of the invention. The NPUs 405A and 405B are coupled with the central line processor 410. In one embodiment, the NPUs 405A and 405B are associated with different ports of the line card. The NPUs 405A and 405B each receive control packets and perform identifier key rate limiting and protocol based limiting separately. Thus, the NPUs 405A-405B do not share a memory domain and are not independently aware of what the other processes. Thus, it is possible that different NPUs can be processing control packets for the same protocol and identifier key at substantially the same time. As illustrated in FIG. 4, the NPU 405A performs the identifier key rate limiting 415, 420, and 425 for the same protocol (e.g., DHCP) with an identifier key of MAC1, MAC2, and MAC3 respectively. The NPU 405B performs the identifier key based rate limiting 430 and 435 for that same protocol (e.g., DHCP) with an identifier key of MAC4, and MAC1 respectively. Thus, the NPU 405A performs the identifier key based rate limiting 415 for a DHCP packet with an identifier key of MAC1 and the NPU 405B performs the identifier key based rate limiting 435 for a DHCP packet with the same identifier key of MAC1.

The NPU 405A then applies the protocol based rate limiting 440 to those packets which pass the identifier key based rate limiting 415, 420, and 425. As illustrated in FIG. 4, the DHCP packet with an identifier of MAC1 has passed the identifier key based rate limiting 415 and the DHCP packet with an identifier of MAC3 has passed the identifier key based rate limiting 425. The DHCP packet with an identifier of MAC2 did not pass the identifier key based rate limiting 420. Similarly, the NPU 405B applies the protocol based rate limiting 445 to those packets which pass the identifier key based rate limiting 430 and 435. As illustrated, the DHCP packets with identifiers MAC4 and MAC1 have passed the identifier key based rate limiting 430 and 435 respectively.

The NPU 405A sends those packets which pass the protocol based rate limiting 440 to the central line processor 410 for further processing. As illustrated, the DHCP packets with identifiers MAC1 and MAC3 pass the protocol based rate limiting 440 and are sent to the central line processor 410 for further processing. Similarly, the NPU 405B sends those packets which pass the protocol based rate limiting 445 to the central line processor 410 for further processing. The NPUs 405A and 405B also send the protocol identifier with the packets along with the current rate counters (identifier key rate counters and protocol rate counters). As illustrated, the DHCP packet with an identifier of MAC1 has passed the protocol based rate limiting 445 yet the DHCP packet with an identifier of MAC4 did not pass and is not sent to the central line processor 410.

The central line processor 410 aggregates those packets from the same protocol and identifier key for those packets its receives from the NPUs 405A and 405B. For example, the central line processor 410 adds the values of the identifier key rate counters for the same identifier key and protocol received from the NPUs 405A and 405B. Similarly, the central line processor 410 adds the values of the protocol rate counters for the control packets that have the same protocol identifier received from the NPUs 405A and 405B. By way of example, the central line processor 410 aggregates the identifier key rate counters for the DHCP packets with the identifier of MAC1 received from the NPUs 405A and 405B. Based on the aggregate value of the identifier key rate counters, the identifier key based limiting 450 is performed. Those packets which pass the identifier key based limiting 450 are then rate limited by the protocol limiting 455, which is based on the aggregate value of the protocol rate counters. Those packets which pass the protocol limiting 455 are then allowed to be sent to the control card for further processing.

Figure 5:
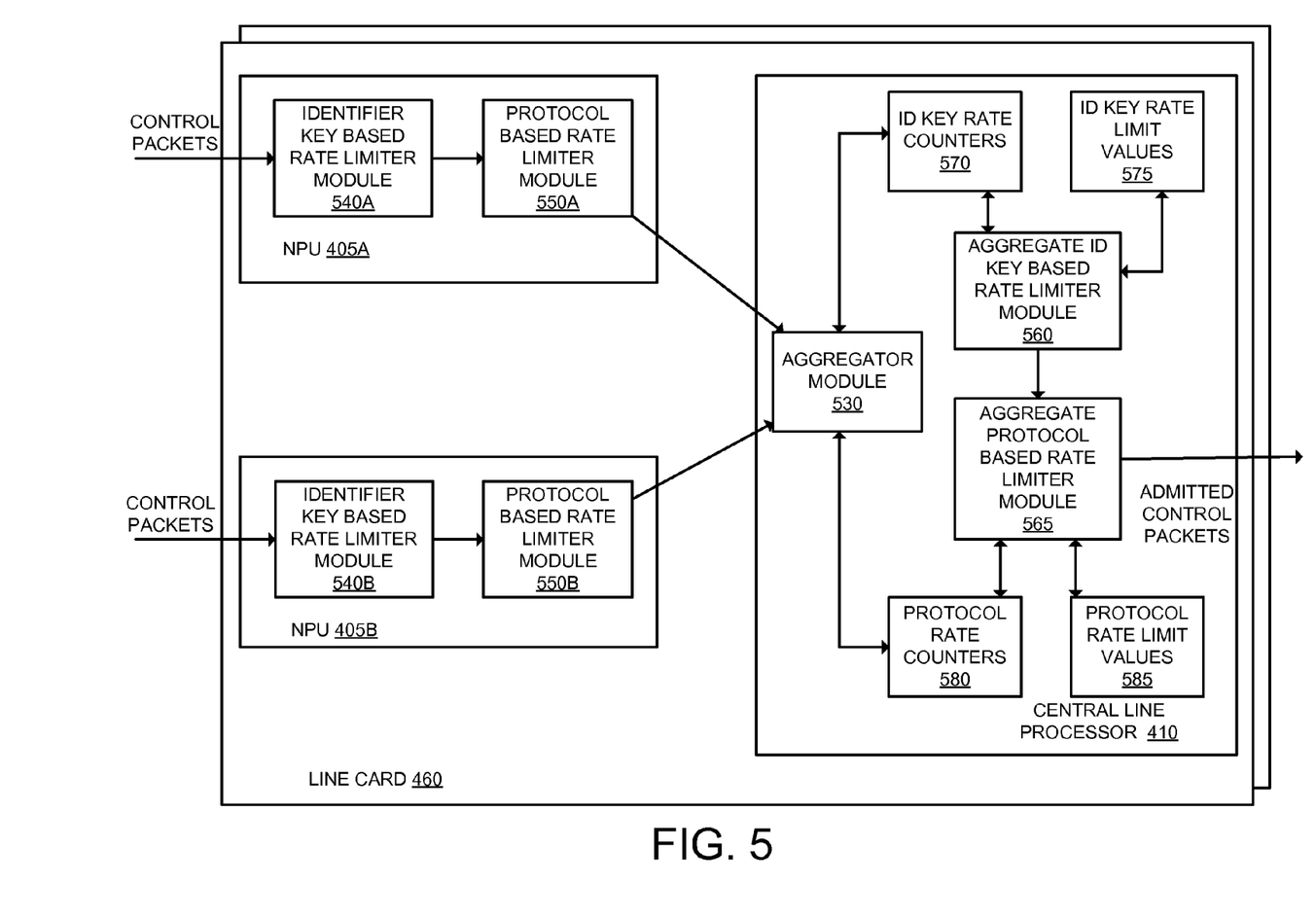
FIG. 5 illustrates an exemplary line card that includes multiple network processing units that performs hierarchical rate limiting for control packets according to one embodiment of the invention.

In one embodiment, each of the NPUs performs similar operations as described with reference to FIGS. 2 and 3 with the exception that instead of sending those control packets which pass the hierarchical rate limiting to the control card, those control packets are sent to the central line processor for further aggregation and rate limiting. In such an embodiment, each of the NPUs includes multiple execution units to perform the identifier key based rate limiting and a set of one or more execution units to perform the protocol based rate limiting. For example, FIG. 5 illustrates a more detailed view of one of the line cards that includes multiple network processing units that performs hierarchical rate limiting according to one embodiment of the invention. As illustrated in FIG. 5, the NPU 405A and 405B respectively include the identifier key based rate limiter module 540A and 540B and the protocol based rate limiter module 550A and 550B. Although not illustrated for the sake of brevity, it should be understood that for each of the NPUs 405A and 405B, multiple execution units execute an instance of the identifier key based rate limiter modules 540A and 540B and a set of one or more execution units executes the protocol based rate limiting modules 550A and 550B. In one embodiment, the identifier key based limiter modules 540A and 540B perform similarly to the identifier key based limiter module 140 illustrated in FIG. 1, and the protocol based rate limiter modules 550A and 550B perform similarly to the card level based limiter module 150 with the exception that the packets which pass the protocol based rate limiting are sent to the central line processor 410 instead of being allowed to be sent to the control card.

Those packets which pass the protocol based rate limiting from each of the NPUs 405A and 405B are sent to the central line processor 410 along with a protocol identifier and the associated packet counters (e.g., the current identifier key packet count value and the current protocol packet count value). The central line processor 410 aggregates the control packets received from the different NPUs 405A and 405B based on identifier key and protocol and applies an aggregate identifier key based rate limiting and an aggregate protocol based rate limiting to those control packets. For example, the aggregator module 530 aggregates the identifier key packet count values for each different identifier key of the control packets it receives, and aggregates the protocol packet count values for the control packets it receives. The aggregator module 530 updates the identifier key rate counters 570 and the protocol rate counters 580 as appropriate (e.g., with an updated packet count).

Sometime after a packet is aggregated with the other like packets, the aggregate identifier key based rate limiter module 560 accesses the identifier key rate limit values 570 and retrieves the rate limit value associated with the identifier key of that packet. The retrieved rate limit value is compared with the aggregated packet count for that identifier key. Those packets whose aggregate packet count value is greater than its associated rate limit value are dropped. Those packets which pass the aggregate identifier key based rate limiting are then rate limited based on their protocol or control packet type.

The aggregate protocol level based rate limiter 565 accesses the protocol rate limit values 585 and retrieves the rate limit value associated with the protocol or control packet type of the control packet. The retrieved rate limit value is compared with the aggregated packet count for that protocol or control packet type. Those packets whose aggregate packet count value exceeds its associated rate limit value are dropped. Those packets which pass the aggregate protocol based rate limiting are then allowed to be sent to the control card for further processing.

Figure 6:
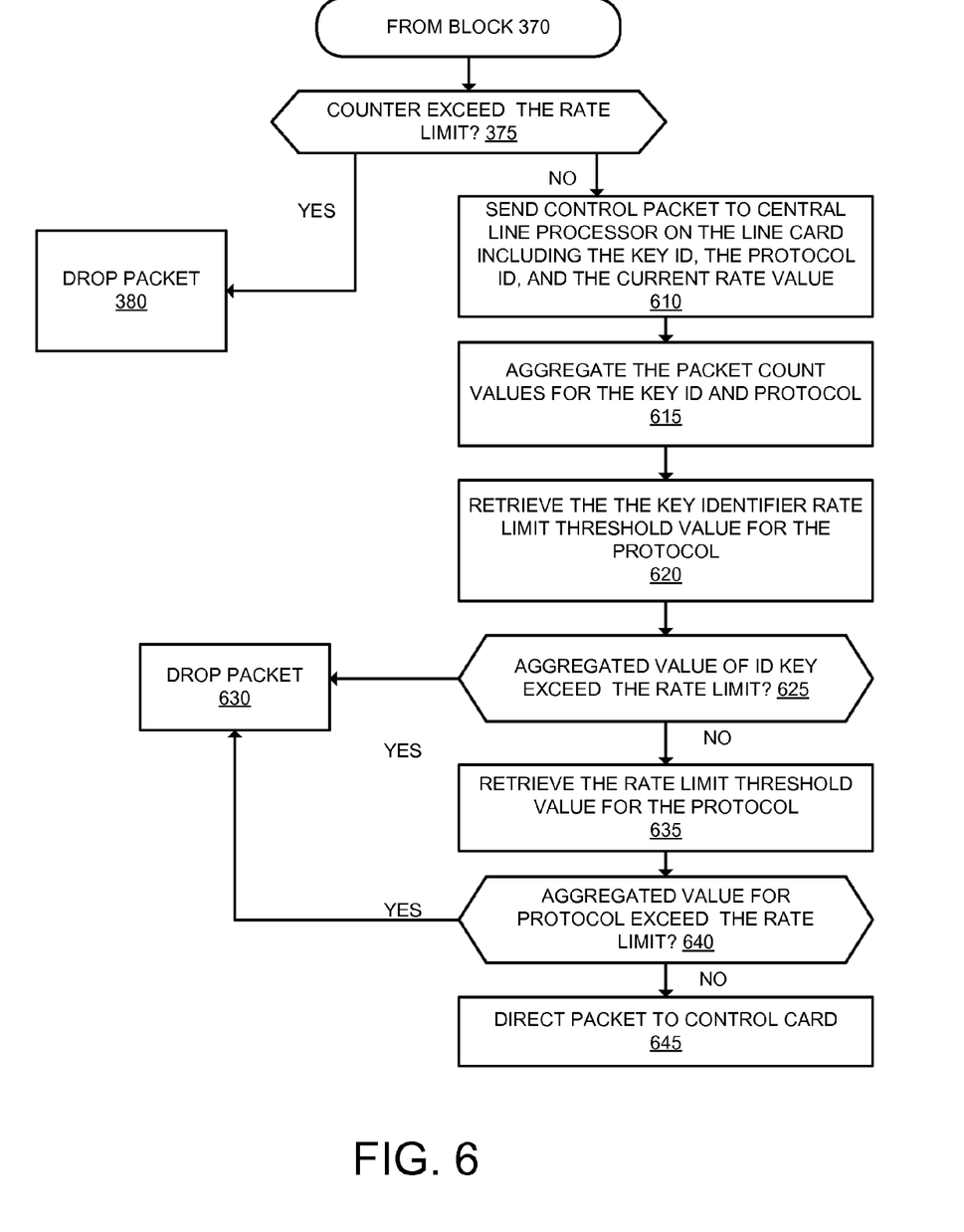
FIG. 6 is a flow diagram illustrating exemplary operations for hierarchical rate limiting in line cards with multiple network processing units according to one embodiment of the invention.

FIG. 6 is a flow diagram illustrating exemplary operations for hierarchical rate limiting in line cards with multiple network processing units according to one embodiment of the invention. The operations of FIG. 6 will be described with reference to the exemplary embodiment of FIG. 5. However, it should be understood that the operations of FIG. 6 can be performed by embodiments of the invention other than those discussed with reference to FIG. 5, and the embodiments discussed with reference to FIG. 5 can perform operations different than those discussed with reference to FIG. 6.

As illustrated in FIG. 6, the flow of operations begins at the block 375 as described with reference to FIG. 3. According to one embodiment, the operations described with reference to FIG. 3 (e.g., the operations described in reference to blocks 310-370) is performed by one of the NPUs 405A and 405B. For example, at block 310, one of the NPUs 405A and 405B receives a control packet. For purposes of explanation, the operations described in reference to FIG. 6 assume that the NPU 405A has received a control packet.

At block 375, the protocol based rate limiting module 550A determines whether the addition of the control packet to the value of the protocol based rate counter exceeds the protocol based rate limit associated with the protocol type or the control packet type of the received packet. If the protocol rate limit value is exceeded, then flow moves to block 380 where the packet is dropped, otherwise flow moves to block 610.

At block 610, the NPU 405A sends the control packet to the central line processor 410 along with the key identifier of the control packet, the protocol identifier of the control packet, and the current packet count values associated with the control packet (e.g., the current key identifier packet count values and the current protocol packet count values). Flow moves from block 610 to block 615.

At block 615, the central line processor 410 aggregates the packet count values associated with the received control packet. For example, the aggregator module 530 aggregates the packet count values associated with the received control packet by adding those values to the values stored in the identifier key rate counters 570 and the protocol rate counters 580. The aggregator module 530 may also update a timestamp of the packet in the identifier key rate counters 570 and the protocol rate counters 580. Of course, it should be understood that if the received control packet is the first packet received with the identifier key or protocol, the aggregator module 530 can create entries for the packet in the identifier key rate counters 570 and the protocol rate counters 580.

Flow moves from block 615 to block 620, where the aggregate identifier key based rate limiter module 560 accesses the identifier key rate limit values 575 and retrieves the identifier key rate limit value associated with the identifier key of the packet. Also, the aggregate identifier key based rate limiter module 560 accesses the identifier key rate counters 570 and retrieves the number of packets admitted over the time period with that identifier key. Flow moves from block 620 to block 625, where the aggregate identifier key based rate limiter module 560 determines whether the aggregated packet count value exceeds the identifier key base rate limit. If the count exceeds the rate limit, then flow moves to block 630 where the packet is dropped, otherwise flow moves to block 635 where a protocol based rate limiting begins.

At block 635, the aggregate protocol based rate limiter module 565 accesses the protocol rate limit values 585 and retrieves the protocol rate limit value associated with the control packet (e.g., based on the protocol identifier transmitted with the control packet). In addition, the aggregate protocol based rate limiter module 565 accesses the protocol rate counters 580 and retrieves the number of packets admitted having the protocol identifier of the control packet. Flow moves from block 635 to block 640, where the aggregate protocol based rate limiter module 565 determines whether the aggregated packet count value for the protocol identifier exceeds the protocol rate limit value for that protocol identifier. If the count exceeds the rate limit, then flow moves to block 630 where the packet is dropped. However, if the count does not exceed the rate limit, then flow moves to block 640 where the packet is directed to the control card for further processing.

Thus in some embodiments, the line cards perform multiple hierarchical levels of control packet rate limiting. However, it should be understood that in some embodiments one or more of the levels of control packet rate limiting are omitted. For example, in the case where the line cards include multiple network processing units and a central line processor, in one embodiment the rate limiting is applied only at the network processing unit (thus, in such an embodiment the network processing units do not perform control packet rate limiting). As another example, in some embodiments the protocol based rate limiting is omitted.

In some embodiments, in addition to identifier key based rate limiting and protocol based rate limiting, the control packets are rate limited based on the number of events per second. By way of example, an event is the receipt of a control packet, regardless of protocol, on the line card. For example, prior to the identifier key based rate limiting, upon receipt of a control packet, the line card determines whether the control packet passes the event per second rate limiting. If the packet passes the event per second rate limiting, the identifier key based rate limiting is then performed. If the packet does not pass the event per second rate limiting, the line card will drop the packet. In one embodiment, the events per second rate limiting is specific to circuits (that is, the events per second rate limiting is applied separately for each different circuit).

Although embodiments have been described with respect to control packet rate limiting based on key identifiers and based on protocol type, in other embodiments the control packets may further be limited at different granularities (e.g., per port, per VLAN/ATM-PVC, per subscriber, etc.). In addition, in some embodiments, instead of rate limiting the control packets based on key identifiers in the packet and based on protocol type of the control packets, the control packets are limited at different granularities (e.g., per port, per VLAN/ATM-PVC, per subscriber, etc.).

Although embodiments have been described with respect to rate limiting control packets based on a class of identifier keys (e.g., treating the control packets with unique identifier keys of the same protocol equally by having the same identifier key rate limit value), in some embodiments the identifier key rate limit value can be specific to individual identifier keys. Additionally, in some embodiments the identifier key rate limit values are dynamic and can change for individual identifier keys depending on history of control packets received (e.g., responsive to detecting an abnormally high amount of control packets for that identifier key (and thus a possible denial of service attack), the rate limit value for that identifier key can be lowered).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A network element to perform hierarchical control packet rate limiting, comprising:
a control card including,
 a set of one or more protocol modules to process control packets received from a plurality of line cards; and
the plurality of line cards coupled with the control card, each line card including,
 a packet parsing engine to receive and parse control packets and write packet data into a buffer memory of the line card, the packet data including a set of one or more identifier keys associated with each of the control packets,
 an identifier key based rate limiter module to perform identifier key rate based limiting on the control packets per the set of identifier keys of those control packets, wherein the identifier key based rate limiter module is to perform the following for each control packet,
  compare an identifier key packet count value associated with the set of identifier keys for that packet with a identifier key rate limit value associated with that set of identifier keys, wherein the identifier key packet count value represents a number of control packets accepted for processing in a first time interval having that set of identifier keys,
  drop the control packet if the identifier key packet count value exceeds the identifier key rate limit value for that first time interval;
 a protocol based rate limiter module to perform protocol based rate limiting on those control packets whose associated identifier key packet count value does not exceed their associated identifier key rate limit value, wherein the protocol based rate limiter module is to perform the following for each of those control packets:
  compare a protocol packet count value associated with a protocol type of the control packet with a protocol rate limit value associated with that protocol type, wherein the protocol packet count value represents a number of control packets accepted for processing in a second time interval having that protocol type,
  drop the control packet if the protocol packet count value exceeds the protocol rate limit value for that second time interval, and
  send the control packet to the control card if the protocol packet count value does not exceed the protocol rate limit value for that given time period.

2. The network element of claim 1, wherein the control card further includes a command line interface module to receive the identifier key rate limit value and the protocol rate limit value from a system operator of the network element, and further receive an amount of time for the first time interval and an amount of time for the second time interval.

3. The network element of claim 1, wherein the identifier key based rate limiter module is to perform the identifier key rate based limiting for those packets which are PADR (PPPoE Active Discovery Request) packets and PADI (PPPoE Active Discovery Initiate) packets separately, wherein the set of identifier keys used in the identifier key based rate limiting for PADR packets and PADI packets includes one or more of a source MAC address, a VLAN (Virtual Local Area Network) identifier, and a port identifier.

4. The network element of claim 1, wherein the control packets include DHCP (Dynamic Host Configuration Protocol) control packets, and wherein the set of identifier keys used for each of the DHCP control packets includes one or more of a source MAC address included in that DCHP control packet, a source IP (Internet Protocol) address in that DHCP control packet, a VLAN (Virtual Local Area Network) identifier in that DHCP control packet, an ATM (Asynchronous Transfer Mode) PVC (Permanent Virtual Circuit) identifier in that DHCP control packet, a GIADDR (Gateway IP Address) in that DHCP control packet, and a port identifier on which the DHCP control packet is received on.

5. A line card for rate limiting control packets, comprising:
a plurality of network processing units (NPUs), each NPU having a separate memory domain, wherein each NPU is coupled with one or more ports of the line card, and each NPU includes the following:
  a packet parsing engine to parse control packets to determine a protocol type of each control packet and extract a set of one or more identifier keys from each control packet based on the determined protocol type of that control packet,
  a plurality of first level execution units to perform an identifier key based rate limiting for each unique set of extracted identifier keys per protocol type, wherein each of the first level execution units is to drop those control packets which do not pass the identifier key based rate limiting,
  a set of one or more second level execution units coupled with the plurality of first level execution units, the set of second level execution units to perform the following:
    a protocol based rate limiting for each of those control packets that pass the identifier key based rate limiting for each protocol type,
    drop those control packets which do not pass the protocol based rate limiting, and
    send each of those control packets which pass the protocol based rate limiting to a central line processor of the line card;
the central line processor coupled with the plurality of NPUs, the central line processor to perform the following:
  aggregate those control packets received from the plurality of NPUs that have a same set of identifier keys,
  aggregate those control packets received from the plurality of NPUs that have a same protocol type,
  perform an aggregate identifier key based rate limiting on the control packets received from the plurality of NPUs for each unique set of identifier keys per protocol type,
  drop those control packets that fail the aggregate identifier key based rate limiting,
  perform an aggregate protocol based rate limiting for each of those control packets that pass the aggregate identifier key based rate limiting for each unique protocol type,
  drop those control packets that fail the aggregate protocol based rate limiting, and
  send those packets that pass the aggregate protocol based rate limiting to a control card coupled with the line card.

6. The line card of claim 5, wherein the control packets include PADR (PPPoE Active Discovery Request) packets and PADI (PPPoE Active Discovery Initiate) packets, and wherein the PADR packets and PADI packets are rate limited separately.

7. The line card of claim 5, wherein the control packets includes DHCP (Dynamic Host Configuration Protocol) control packets, and wherein the set of identifier keys used for each of the DHCP control packets includes a source MAC address included in that DCHP control packet, a source IP (Internet Protocol) address in that DHCP control packet, a VLAN (Virtual Local Area Network) identifier in that DHCP control packet, an ATM (Asynchronous Transfer Mode) PVC (Permanent Virtual Circuit) identifier in that DHCP control packet, a GIADDR (Gateway IP Address) in that DHCP control packet, and a port identifier on which the DHCP control packet is received on.

* * * * *

UNITED STATES PATENT AND TRADEMARK OFFICE
CERTIFICATE OF CORRECTION

| | | |
|---|---|---|
| PATENT NO. | : 8,249,088 B2 | Page 1 of 1 |
| APPLICATION NO. | : 12/432383 | |
| DATED | : August 21, 2012 | |
| INVENTOR(S) | : Gupta et al. | |

It is certified that error appears in the above-identified patent and that said Letters Patent is hereby corrected as shown below:

On the Face Page, in the Figure, in Box "155", in Line 3, delete "VALES" and insert -- VALUES --, therefor.

In Fig. 1, Sheet 1 of 6, in Box "155", in Line 3, delete "VALES" and insert -- VALUES --, therefor.

In Fig. 6, Sheet 6 of 6, in Box "620", in Line 1, delete "THE THE KEY" and insert -- THE KEY --, therefor.

In Column 7, Line 56, delete "DCHP" and insert -- DHCP --, therefor.

In Column 7, Line 63, delete "DCHP" and insert -- DHCP --, therefor.

In Column 17, Line 7, in Claim 4, delete "DCHP" and insert -- DHCP --, therefor.

In Column 18, Line 32, in Claim 7, delete "DCHP" and insert -- DHCP --, therefor.

Signed and Sealed this
Twentieth Day of November, 2012

David J. Kappos
*Director of the United States Patent and Trademark Office*